(12) United States Patent
Potkonjak

(10) Patent No.: US 9,768,767 B2
(45) Date of Patent: *Sep. 19, 2017

(54) AGING-BASED LEAKAGE ENERGY REDUCTION METHOD AND SYSTEM

(71) Applicant: EMPIRE TECHNOLOGY DEVELOPMENT LLC, Wilmington, DE (US)

(72) Inventor: Miodrag Potkonjak, Los Angeles, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/336,808

(22) Filed: Oct. 28, 2016

(65) Prior Publication Data
US 2017/0047920 A1  Feb. 16, 2017

Related U.S. Application Data

(63) Continuation of application No. 14/407,072, filed as application No. PCT/US2013/020438 on Jan. 6, 2013, now Pat. No. 9,520,292.

(51) Int. Cl.
*H03K 17/16* (2006.01)
*G06F 17/50* (2006.01)
(Continued)

(52) U.S. Cl.
CPC ....... *H03K 17/161* (2013.01); *G06F 17/5045* (2013.01); *H01L 21/28* (2013.01);
(Continued)

(58) Field of Classification Search
CPC .......... H03K 17/161; H03K 2217/0036; G06F 17/5045; G06F 2217/76; G06F 2217/78;
(Continued)

(56) References Cited

U.S. PATENT DOCUMENTS 5,825,883 A  10/1998  Archibald et al.
6,047,247 A  4/2000  Iwanishi et al.
(Continued)

FOREIGN PATENT DOCUMENTS

CN  1344942  4/2002
CN  1566980  1/2005
(Continued)

OTHER PUBLICATIONS

Gang Qu et al., "Analysis of Watermarking Techniques for Graph Coloring Problem", ICCAD98 International Conference on Computer-Aided Design, Nov. 1998, pp. 190-193.
(Continued)

*Primary Examiner* — Brandon S Cole
(74) *Attorney, Agent, or Firm* — Turk IP Law, LLC

(57) ABSTRACT

A technique of reducing leakage energy associated with a post-silicon target circuit is generally described herein. One example method includes purposefully aging a plurality of gates in the target circuit based on a targeted metric including a timing constraint associated with the target circuit.

21 Claims, 9 Drawing Sheets

(51) Int. Cl.
*H01L 21/28* (2006.01)
*H01L 29/40* (2006.01)
*H01L 21/326* (2006.01)
*H01L 21/8234* (2006.01)
*H01L 21/66* (2006.01)

(52) U.S. Cl.
CPC .... *H01L 21/326* (2013.01); *H01L 21/823437* (2013.01); *H01L 22/20* (2013.01); *H01L 29/408* (2013.01); *G06F 2217/76* (2013.01); *G06F 2217/78* (2013.01); *G06F 2217/84* (2013.01); *H01L 22/14* (2013.01); *H03K 2217/0036* (2013.01)

(58) Field of Classification Search
CPC ... G06F 2217/84; H01L 21/28; H01L 21/326; H01L 21/823437; H01L 22/20; H01L 29/408; H01L 22/14
USPC .................................................. 327/524–602
See application file for complete search history.

(56) References Cited

U.S. PATENT DOCUMENTS

| | | | |
|---|---|---|---|
| 6,157,231 | A | 12/2000 | Wasson |
| 6,223,314 | B1 | 4/2001 | Arabi et al. |
| 6,469,518 | B1 | 10/2002 | Davis et al. |
| 6,604,228 | B1 | 8/2003 | Patel et al. |
| 6,825,684 | B1 | 11/2004 | Kim et al. |
| 6,829,515 | B2 | 12/2004 | Grimm |
| 6,903,564 | B1 | 6/2005 | Suzuki |
| 7,005,871 | B1 | 2/2006 | Davies et al. |
| 7,017,043 | B1 | 3/2006 | Potkonjak |
| 7,054,787 | B2 | 5/2006 | Gauthier et al. |
| 7,075,284 | B2 | 7/2006 | Watanabe et al. |
| 7,129,800 | B2 | 10/2006 | Gauthier et al. |
| 7,134,600 | B2 | 11/2006 | Tomoeda et al. |
| 7,219,045 | B1 | 5/2007 | Wu et al. |
| 7,225,375 | B2 | 5/2007 | Cochran et al. |
| 7,292,968 | B2 | 11/2007 | Wu et al. |
| 7,471,161 | B2 | 12/2008 | Liu |
| 7,495,519 | B2 | 2/2009 | Kim et al. |
| 7,567,891 | B1 | 7/2009 | Liu et al. |
| 7,587,590 | B2 | 9/2009 | Yamada et al. |
| 7,592,876 | B2 | 9/2009 | Newman |
| 7,647,205 | B2 | 1/2010 | Heap et al. |
| 7,721,157 | B2 | 5/2010 | Spitz et al. |
| 7,757,083 | B2 | 7/2010 | Devadas et al. |
| 7,813,206 | B2 | 10/2010 | Watanabe |
| 7,840,803 | B2 | 11/2010 | Clarke et al. |
| 7,904,755 | B2 | 3/2011 | Patel |
| 8,176,454 | B2 | 5/2012 | Potkonjak |
| 8,260,708 | B2 | 9/2012 | Potkonjak |
| 8,271,400 | B2 | 9/2012 | Lehr et al. |
| 8,781,792 | B2 | 7/2014 | Visweswariah et al. |
| 8,935,143 | B2 | 1/2015 | Kim |
| 8,966,420 | B2 * | 2/2015 | Bansal ............... G01R 31/2881 716/111 |
| 9,177,119 | B2 * | 11/2015 | Potkonjak ............... G06F 21/10 |
| 9,513,329 | B2 * | 12/2016 | Potkonjak .......... G01R 31/2856 |
| 2003/0054577 | A1 | 3/2003 | Yonezawa et al. |
| 2003/0117174 | A1 | 6/2003 | Patel et al. |
| 2004/0249763 | A1 | 12/2004 | Vardi |
| 2005/0141174 | A1 | 6/2005 | Taketani et al. |
| 2005/0227468 | A1 | 10/2005 | Chen et al. |
| 2006/0049886 | A1 | 3/2006 | Agostinelli et al. |
| 2008/0088356 | A1 | 4/2008 | Inada et al. |
| 2008/0141072 | A1 | 6/2008 | Kalgren et al. |
| 2008/0162159 | A1 | 7/2008 | Wang et al. |
| 2010/0188115 | A1 | 7/2010 | von Kaenel |
| 2010/0269150 | A1 * | 10/2010 | Potkonjak ............... G06F 21/10 726/2 |
| 2011/0090015 | A1 | 4/2011 | Sumita et al. |
| 2012/0274480 | A1 | 11/2012 | Potkonjak |
| 2013/0080090 | A1 | 3/2013 | Potkonjak |
| 2015/0061707 | A1 | 3/2015 | Balasubramanian et al. |

FOREIGN PATENT DOCUMENTS

| | | |
|---|---|---|
| CN | 101377538 A | 3/2009 |
| EP | 0623900 A1 | 11/1994 |

OTHER PUBLICATIONS

Gang Qu et al., "Hiding Signatures in Graph Coloring Solutions", Information Hiding Workshop, Sep. 1999, pp. 391-408.

Gang Qu et al., "Optimization-Intensive Watermarking Techniques for Decision Problems", DAC-99 36th ACM/IEEE DAC Design Automation Conference, Jun. 1999, pp. 33-36.

Gang Qu et al., "Fingerprinting Intellectual Property Using Constraint-Addition", IEEE/ACM Design Automation Conference, 2000, pp. 587-592.

Azra Rashid et al., "Hierarchical Watermarking for Protection of DSP Filter Cores", IEEE Custom Integrated Circuits conference, May 1999, pp. 39-42.

J. J. Rissanen, "Generalized Kraft Inequality and Arithmetic Coding", IBM Journal of Research and Development, 1976, pp. 198-203, vol. 20, Issue 3.

Shekhar Borkar, "Designing Reliable Systems from Unreliable Components: The Challenges of Transistor Variability and Degradation", Micro, IEEE, 2005, pp. 10-16, vol. 25, Issue 6.

Dieter K. Schroder, "Negative Bias Temperature Instability: What Do We Understand?", Microelectronics Reliability, 2007, pp. 841-852, vol. A7, No. 6, Elsevier Ltd.

Jerome M. Shapiro, "Embedded Image-Coding Using Zerotrees of Wavelet Coefficients", IEEE Transaction on Signal Processing, Dec. 1993, pp. 3445-3462, vol 41, No. 12.

Greg Sonnenfeld et al., "An Agile Accelerated Aging, Characterization and Scenario Simulation System for Gate controlled Power Transistors", IEEE Autotestcon, 2008, pp. 208-215.

Brinkley Sprunt, "Pentium 4 Performance-Monitoring Features", IEEE Micro, 2002, pp. 72-82, vol. 22, No. 4.

W. Tazibt et al., "A Junction Characterization for Microelectronic Devices Quality and Reliability", Microelectronics Reliability, 2008, pp. 348-353, vol. 48, Issue 3.

Gregory K. Wallace, "The JPEG Still Picture Compression Standard", Communications of the ACM, 1991, pp. 30-44, vol. 34, No. 4.

Yu Want et al., "Gate Replacement Techniques for Simultaneous Leakage and Aging Optimization", Design, Automation & Test in Europe Conference & Exhibition, 2009, pp. 328-333.

Sheng Wei et al., "Gate-Level Characterization: Foundations and Hardware Security Applications", ACM/IEEE Design Automation Conference (DAC), Jun. 13-18, 2010, pp. 222-227.

Sheng Wei et al., "Integrated Circuit Digital Rights Management Techniques Using Physical Level Characterization", ACM Workshop on Digital Rights Management 2011, Oct. 21, 2011, pp. 3-13.

Sheng Wei et al., "Integrated Circuit Security Techniques Using Variable Supply Voltage", Design Automation conference (DAC), Jun. 5-10, 2011, pp. 248-253.

Sheng Wei et al., "Robust Passive Hardware Metering", IEEE/ACM International Conference on Computer-Aided Design, Nov. 2011, pp. 802-809.

Sheng Wei et al., "Scalable Consistency-Based Hardware Trojan Detection and Diagnosis", The 5th International Conference on Network and System Security, Sep. 2011, pp. 176-183.

Sheng Wei et al., "Scalable Segmentation-Based Malicious Circuitry Detection and Diagnosis", International Conference on Computer Aided Design, 2010, pp. 483-486.

Sheng Wei et al., "Hardware Trojan Horse Benchmark via Optimal Creation and Placement of Malicious Circuitry," 19th ACM/EDAC/IEEE Design Automation Conference (DAC), Jun. 3-7, 2012, pp. 90-95.

(56) References Cited

OTHER PUBLICATIONS

Shent Wei et al., "Malicious Circuitry Detection Using Thermal Conditioning", IEEE Transactions on Information Forensic sand Security, Sep. 2011, pp. 1136-1145, vol. 6, No. 3.
James B. Wendt et al., "Nanotechnology-Based Trusted Remote Sensing", IEEE SENSORS 2011, Oct. 2011, pp. 1213-1216.
Ian H. Witten et al., "Arithmetic Coding for Data Compression", Communications of the ACM, Jun. 1987, pp. 520-540, vol. 30, No. 6.
Michael E. Wolf et al., "A Data Locality Optimizing Algorithm", Proceedings of the ACM SIGPLAN 1991 conference on Programming language design and implementation, Jun. 26-28, 1991, pp. 30-44.
Greg Wolfe et al., "Watermarking Graph Partitioning Solutions", IEEE Transactions on Computer-Aided Design of Integrated Circuits and Systems, Jun. 18-22, 2001, pp. 486-489, vol. 21, No. 10.
Jennifer L. Wong et al. "Fair Watermarking Using Combinatorial Isolation Lemmas", IEEE Transactions on Computer-Aided Design of Integrated Circuits and Systems, Nov. 2004, pp. 1566-1574, vol. 23, No. 11.
Jacob Ziv et al., "A Universal Algorithm for Sequential Data Compression", IEEE Transactions on Information Theory, May 1977, pp. 337-343, vol. IT-23, No. 3.
Vojin Zivojnovic et al., "DSPstone: A DSP-Oriented Benchmarking Methodology", Proceedings of Signal Processing Applications & Technology, 1994, pp. 6.
European Search Report for European Application No. 10 15 6500, European Patent Office, The Hague, Netherlands, Jul. 6, 2010.
International Search Report and Written Opinion of the International Searching Authority, International application No. PCT/US2010/043963, Oct. 26, 2010.
International Search Report and Written Opinion of the International Searching Authority, International application No. PCT/US2013/020438, Mar. 11, 2013.
Shekhar Borkar et al., "Parameter Variations and Impact on Circuits and Microarchitecture", DAC 2003, Jun. 2-6, 2003, pp. 338-342, Anaheim, California, USA.
B. Cheng et al., "Evaluation of Statistical Variability in 32 and 22 nm Technology Generation LSTP MOSFETs", Solid-State Electronics, 2009, pp. 767-772, vol. 53.
A.E. Islam et al., "Theory and Practice of On-the-Fly and Ultra-Fast VT Measurements for NBTI Degradation: Challenges and Opportunities", IEDM, 2007, pp. 805-808.
Dejan Markovic et al., "Ultralow-Power Design in Near-Threshold Region", Proceedings of the IEEE, Feb. 2010, pp. 237-252, vol. 98, No. 2.
Mridul Agarwal et al., "Circuit Failure Prediction and Its Application to Transistor Aging", 25th IEEE VLSI Test Symmposium, 2007, pp. 277-286, IEEE Computer Society.
Brian Cline et al., "Analysis and Modeling of CD Variation for Statistical Static Timing", ICCAD'06, Nov. 5-9, 2006, pp. 60-66, San Jose, CA.
Asen Asenov, "Random Dopant Induced Threshold Voltage Lowering and Fluctuations in Sub-0.1 um MOSFET's: A 3-D Atomistic Simulation Study", IEEE Transactions on Electron Devices, Dec. 1998, pp. 2505-2513, vol. 45, No. 12.
Lin Yuan et al., "A Combined Gate Replacement and Input Vector Control Approach for Leakage Current Reduction", IEEE Transactions on Very Large Scale Integration (VLSI) Systems, Feb. 2006, pp. 173-182, vol. 14, No. 2.
Tom Chen et al., "Comparison of Adaptive Body Bias (ABB) and Adaptive Supply Voltage (ASV) for Improving Delay and Leakage Under the Presence of Process Variation", IEEE Transactions on Very Large Scale Integration (VLSI) Systems, Oct. 2003, pp. 888-899, vol. 11, No. 5.
Justin Gregg et al., "Post Silicon Power/Performance Optimization in the Presence of Process Variations Using Individual Well-Adaptive Body Biasing", IEEE Transactions on Very Large Scale Integration (VLSI) Systems, Mar. 2007, pp. 366-367, vol. 15, No. 3.

Ani Nahapetian et al., "Optimization for Real-Time Systems with Non-convex Power Versus Speed Models", PATMOS, 2007, pp. 443-452.
Michael Nelson et al., "SVD-Based Ghost Circuitry Detection", Information Hiding: 11th International Workshop 2009, 2009, pp. 221-234, Springer-Verlag Berlin Heidelberg.
Alireza Vahdatpour et al., "Leakage Minimization Using Self Sensing and Thermal Management", International Symposium on Low Power Electronics and Design (ISLPED), Aug. 18-20, 2010, pp. 265-270.
Jason Xin Zheng et al., "Securing Netlist-Level FPGA Design through Exploiting Process Variation and Degradation", FPGA'12, Feb. 22-24, 2012, pp. 129-139.
Sheng Wei et al., "Scalable Hardware Trojan Diagnosis", accepted for publication, IEEE Transactions on Very Large Scale Integration (VLSI) Systems, 2011.
Sheng Wei et al., "Gate Characterization Using Singular Value Decomposition: Foundations and Applications", accepted for publication, IEEE Transactions on Information Forensics and Security, 2010.
Sheng Wei et al., "Hardware Trojan House Benchmark via Optimal Creation and Placement of Malicious Circuitry", DAC 2012, Jun. 3-7, 2012, pp. 90-95, San Francisco, California, USA.
Alec Feinberg et al., "Transistor Aging Models of Key Device Parameters Due to Leakage Degradation", M/A-COM Reliability Tech Brief, accessed at <URL: https://web.archive.org/web/20061017163909/http://www.macom.com/QualityReliability/pdf/transistor%20aging%20TB> on Apr. 1, 2015, pp. 11.
S. Chakravarthi et al., "A Comprehensive Framework for Predictive Modeling of Negative Bias Temperature Instability", 42th Annual International Reliability Physics Symposium Proceedings, 2004, pp. 273-282, IEEE.
"The Top 30 Global Medical Device Companies", Jul./ Aug. 2006, Retrieved on May 20, 2014, Retrieved from the URL at <http://web.archive.org/web/20121115174842/http://www.mpo-mag.com/articles/2006/07/top-medical-device-companies-report>, pp. 1-30.
Afshin Abdollahi et al., "Leakage Current Reduction in CMOS VLSI Circuits by Input Vector Control," IEEE Transactions on Very Large Scale Integration (VLSI) Systems, 2004, pp. 22, vol. 12, Issue 2.
Yousra Alkabani et al., "Remote Activation of ICs for Piracy Prevention and Digital Right Management," IEEE/ACM International Conference on Computer-Aided Design, 2007, pp. 674-677.
Yousra Alkabani et al., "Trusted Integrated Circuits: A Nondestructive Hidden Characteristics Extraction Approach," Lecture Notes in Computer Science, 2008, pp. 102-117, vol. 5284, Springs-Verlag Berlin Heidelberg.
Yousra Alkabani et al., "Input Vector Control for Post-Silicon Leakage Current Minimization in the Presence of Manufacturing Variability," 45th ACM/IEEE Design Automation Conference, Jun. 8-13, 2008, pp. 606-609.
David Bailey et al., "The NAS Parallel Benchmarks," Technical Report RNR-91-002 Revision 2, NASA Ames Research Laboratory, Mountain View, Aug. 22, 1991, pp. 1-71 (3 files).
Nathan Beckmann et al., "Hardware-Based Public-Key Cryptography with Public Physically Unclonable Functions," Information Hiding: 11th International Workshop 2009, 2009, pp. 206-220, vol. 5806, Springs-Verlag Berlin Heidelberg.
Jason Blome et al., "Self-calibrating Online Wearout Detection," International Symposium on Microarchitecture, 2007, pp. 109-122.
Foad Dabiri et al., "Hardware Aging-Based Software Metering," DATE09, 2009, pp. 460-465, EDAA.
Miodrag Potkonjak et al., "Hardware Trojan Horse Detection Using Gate-Level Characterization," Design Automation Conference, Jul. 26-31, 2009, pp. 688-693, San Francisco, California, USA.
Jeffrey Dean et al., "ProfileMe: Hardware Support for Instruction-Level Profiling on Out-of-Order Processors", Proceedings of the 30th annual ACM/IEEE international symposium on Microarchitecture, 1997, pp. 292-302.
Matthew K. Franklin et al., "Auditable Metering with Lightweight Security", In Proceedings of Financial cryptography'97, Feb. 1997, pp. 151-160.

(56) References Cited

OTHER PUBLICATIONS

Didier Le Gall, "MPEG: A Video Compression Standard for Multimedia Applications", Communications of the ACM, Apr. 1991, pp. 46-58, vol. 34, No. 4.
Robert G. Gallager, "Variations on a Theme by Huffman", IEEE Transaction on Information Theory, Nov. 1978, pp. 668-674, vol. 24, No. 6.
Peter Glosekotter et al., "Device Degradation and Resilient Computing", IEEE International Symposium on Circuits and Systems, 2008, pp. 828-831.
I. Gomez et al., "Analysis of Simulation-Adapted SPEC 2000 Benchmarks," ACM SIGARCH Computer Architecture News, 2002, pp. 4-10, vol. 30, No. 4.
Matthew R. Guthaus et al., "MiBench: A Free, Commercially Representative Embedded Benchmark Suite", Proceedings of the Workload Characterization, 2001. WWC-4. 2001 IEEE International Workshop, Dec. 2001, pp. 3-14.
John L. Henning, "SPEC CPU2000: Measuring CPU Performance in the New Millennium", IEEE Computer, 2000, pp. 28-35, vol. 33, No. 7.
Inki Hong et al., "Behavioral Synthesis Techniques for Intellectual Property Protection," DAC-99 36th ACM/IEEE DAC Design Automation Conference, Jun. 1999, pp. 849-854.
Inki Hong et al., "Techniques for Intellectual Property Protection of DSP Designs", ICASSP98 International Conference on Acoustic, Speech, and Signal Processing, May 1998, pp. 3133-3136.
David A. Huffman, "A method for the Construction of Minimum-Redundancy Codes", Proceedings of the I.R.E., Sep. 1952, pp. 1098-1101, vol. 40, No. 9.
Jaehyuk Huh et al., "Exploring the Design Space of Future CMPs", Proceedings of the 2001 International Conference on Parallel Architectures and Compilation Techniques, 2001, pp. 199-210.
Kunhyuk Kang et al., "Efficient Transistor-Level Sizing Technique under Temporal Performance Degradation due to NBTI", IEEE International Conference on Computer Design (ICCD06), 2007, pp. 216-221.
John Kelsey et al., "A Peer-to-Peer Software Metering System," In the Second USENIX Workshop on E-Commerce, 1996, pp. 279-286.
Tae-Hyoung Kim et al., "Silicon Odometer: An On-Chip Reliability Monitor for Measuring Frequency Degradation of Digital Circuits", IEEE Journal of Solid-State Circuits, Apr. 2008, pp. 874-880, vol. 43, No. 4.
Darko Kirovski et al., "Intellectual Property Protection by Watermarking Combinational Logic Synthesis Solutions", ICCAD98 International Conference on Computer-Aided Design, Nov. 1998, pp. 194-198.
Darko Kirovski et al., "Local Watermarks: Methodology and Application to Behavioral Synthesis," IEEE Transactions on Computer-Aided Design of Integrated Circuits and Systems, Sep. 2003, pp. 1277-1284, vol. 22, No. 9.
Darko Kirovski et al., "Localized Watermarking: Methodology and Application to Operation Scheduling," IEEE International Conference on Acoustics, Speech, and Signal Processing, 1999, pp. 596-599.
Farinaz Koushanfar et al., "Behavioral Synthesis Techniques for Intellectual Property Protection", ACM Transaction on Design Automation of Electronic Systems, Jul. 2005, pp. 523-545, vol. 10, No. 3.
Farinaz Koushanfar et al., "CAD-based Security, Cryptography, and Digital Rights Management", Design Automation Conference, Jun. 4-8, 2007, pp. 268-269.
Farinaz Koushanfar et al., "Intellectual Property Metering", Information Hiding Workshop, 2001, pp. 81-95.
Bipul C. Paul et al., "Impact of NBTI on the Temporal Performance Degradation of Digital Circuits", IEEE Electron Device Letters, Aug. 2005, pp. 560-562, Vo. 26, No. 8.
Sarvesh H. Kulkarni et al., "Design-Time Optimization of Post-Silicon Tuned Circuits Using Adaptive Body Bias", IEEE Transactions on Computer-Aided Design of Integrated 37 Circuits and systems, Mar. 2008, pp. 481-494, vol. 27, No. 3.
John Lach et al., "Robust FPGA Intellectual Property Protection Through Multiple Small Watermarks", DAC-99 36th ACM/IEEE DAC Design Automation Conference, Jun. 1999, pp. 831-836.
John Lach et al., "Signature Hiding Techniques for FPGA Intellectual Property Protection", ICCAD98 International Conference on Computer-Aided Design, Nov. 1998, pp. 186-189.
Monica S. Lam, "A Data Locality Optimizing Algorithm", ACM SIGPLAN, 2003, pp. 442-459.
Chunho Lee et al., "MediaBench: A Tool for Evaluating and Synthesizing Multimedia and Communications Systems", Proceedings of the 30th annual ACM/IEEE international symposium on Microarchitecture, 1997, pp. 330-335.
Tmehrdad Majzoobi et al., "Lightweight Secure PUFs," ICCAD, 2008, pp. 670-673.
Mehrdad Majzoobi et al., "Testing Techniques for Hardware Security," IEEE International Test Conference, 2008, pp. 1-10.
Seapahn Megerian et al., "Watermarking Integer Linear Programming Solutions," IEEE/ACM Design Automation Conference, Jun. 10-14, 2002, pp. 8-13.
Saro Meguerdichian et al., "Device Aging-Based Physically Unclonable Functions", Design Automation Conference (DAC), Jun. 5-10, 2011, pp. 288-289.
Saro Meguerdichian et al., "Matched Public PUF: Ultra Low Energy Security Platform", International Symposium on Low Power Electronics and Design, Aug. 2011, pp. 45-50.
Saro Meguerdichian et al., "Security Primitives and Protocols for Ultra Low Power Sensor Systems," IEEE SENSORS 2011, Oct. 2011, pp. 4.
Seapahn Meguerdichian et al., "Watermarking While Preserving the Critical Path," IEEE/ACM Design Automation Conference, Jun. 2000, pp. 108-111.
Hassan Mostafa et al., "Adaptive Body Bias for Reducing the Impacts of NBTI and Process Variations on 6T SRAM Cells", IEEE Transactions on Circuits and Systems I: Regular Papers, Dec. 2011, pp. 2859-2871, vol. 58, No. 12.
Moni Naor et al., "Secure Accounting and Auditing on the Web", Computer Networks and ISDN Systems, 1998, pp. 541-550, vol. 30 Retrieved on Jul. 1, 2014 from <URL at: http://www7.scu.edu.au/1927/com1927.htm>.
Pradeep Lall et al., "Characterization of Functional Relationship Between Temperature and Microelectronic Reliability", Microelectronics and Reliability, 1995, pp. 377-402, vol. 35, No. 3.
Matthew A. Postiff et al., "The Limits of Instruction Level Parallelism in SPEC95 Applications", 3rd Workshop on Interaction between Compilers and computer Architectures, 1998, pp. 10.
Miodrag Potkonjak et al., "Differential Public Physically Unclonable Functions: Architecture and Applications", Design Automation Conference (DAC), Jun. 5-10, 2011, pp. 242-247.
Miodrag Potkonjak, "Synthesis of Trustable ICs Using Untrusted CAD Tools", ACM/IEEE Design Automation Conference (DAC), Jun. 13-18, 2010, pp. 633-634.

\* cited by examiner

AGING-BASED LEAKAGE ENERGY REDUCTION METHOD AND SYSTEM

CROSS-REFERENCE TO RELATED APPLICATIONS

The present application is a continuation application under 35 U.S.C. §120 U.S. patent application Ser. No. 14/407,072, filed on Dec. 11, 2014, now U.S. Pat. No. 9,520,292, which is a U.S. National Stage filing under 35 U.S.C. §371 of International Application No. PCT/US2013/020438, filed on Jan. 6, 2013 and entitled "AGING-BASED LEAKAGE ENERGY REDUCTION METHOD AND SYSTEM," U.S. patent application Ser. No. 14/407,072 and International Application No. PCT/US2013/020438, including any appendices or attachments thereof, are hereby incorporated by reference in their entirety.

BACKGROUND

Unless otherwise indicated herein, the approaches described in this section are not prior art to the claims in this application and are not admitted to be prior art by inclusion in this section.

Process variation (PV) in IC manufacturing refers to the deviation of IC parameter values from nominal specifications, due to the nature of the manufacturing process generally. The presence of PV in deep submicron technologies has become a major concern for integrated circuit (IC) energy optimization attempts. Some existing pre-silicon IC optimization to compensate for the impact of PV apply statistical analysis to capture the PV influence and compensate for the influence in the IC design. These approaches generally are not generic to various designs and technologies, and they can be greatly impacted by random components, such as environment temperatures, which may not be timely reflected in the design models.

Some post-silicon optimization approaches also exist to address the aforementioned issues that the pre-silicon optimization approaches are unable to resolve. However, the existing approaches do not take into consideration any IC aging effect caused by low energy input vectors. In particular, IC aging has long been considered as a detrimental phenomenon to IC design and operation, because it may cause an increase in the threshold voltage, and thus it may result in delay degradation over time. However, the threshold voltage increase brought by IC aging may cause the leakage energy of a gate to decrease.

Accordingly, methods and systems are described herein to utilize IC aging to reduce leakage energy consumption of a target circuit during the operations of the target circuit.

SUMMARY

In accordance with at least some embodiments of the present disclosure, a method is described for reducing leakage energy associated with a post-silicon target circuit. Some example methods may include purposefully aging a plurality of gates in the target circuit based on a targeted metric including a timing constraint associated with the target circuit.

In accordance with at least some embodiments of the present disclosure, a computer-readable medium containing a sequence of instructions for reducing leakage energy associated with a post-silicon target circuit is also described. Some example instructions, which when executed by a processor, may cause the process to purposefully age a plurality of gates in the target circuit based on a targeted metric including a timing constraint associated with the target circuit.

In accordance with at least some embodiments of the present disclosure, a computing device coupled to a post-silicon target circuit and configured to reduce leakage energy associated with the post-silicon target circuit is described. Some examples computing devices may include a programmable unit and a processor, and the processor may be configured to purposefully age a plurality of gates in the target circuit based on a targeted metric including a timing constraint associated with the target circuit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

In the drawings.

DETAILED DESCRIPTION

Figure 1:
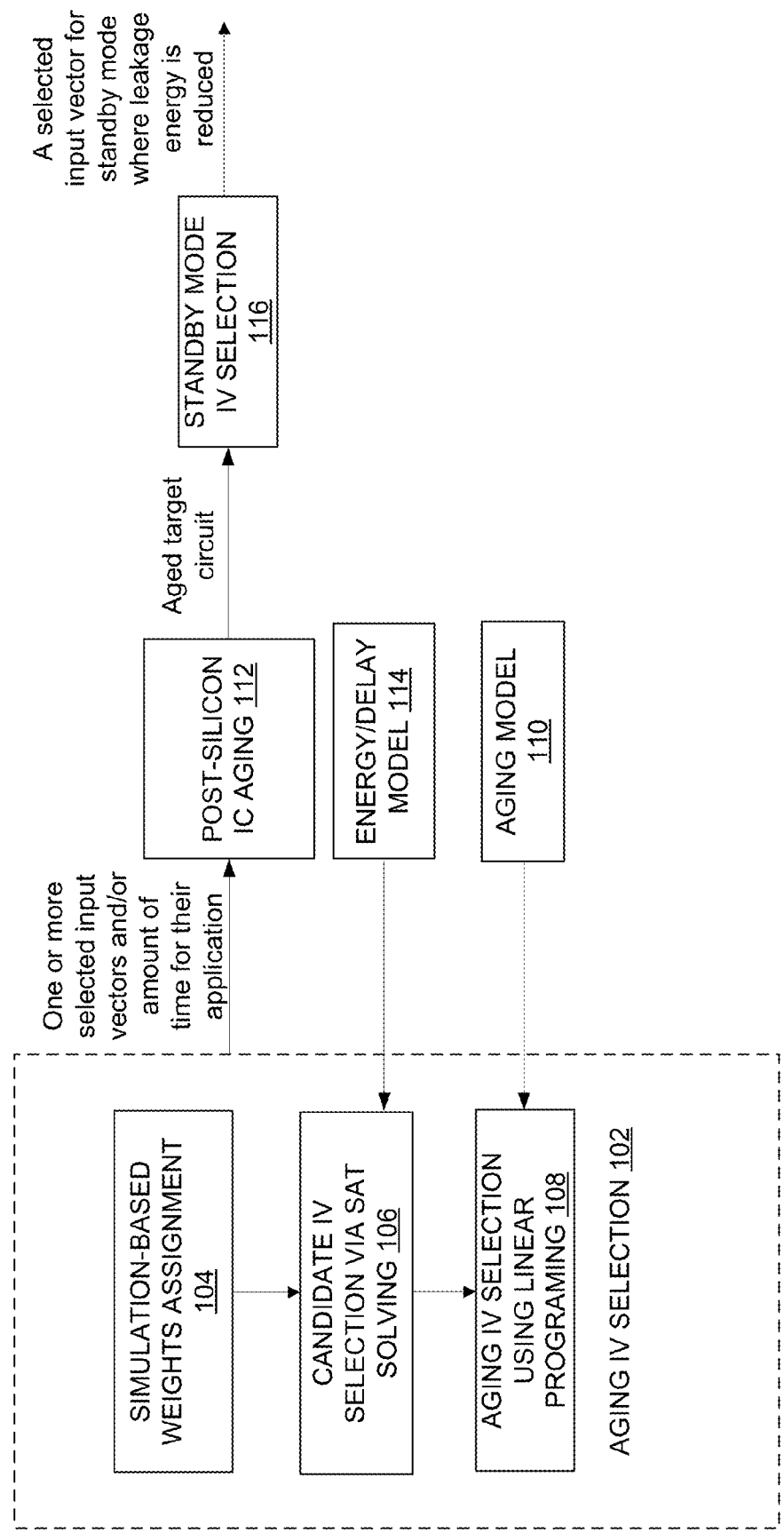
FIG. 1 shows a block diagram of an example process for performing aging-based leakage energy reduction for a post-silicon target circuit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is generally drawn, inter alia, to devices, systems, methods, and computer programs related to aging-based leakage energy reduction schemes as will be described herein.

Embodiments of the systems and methods described herein involve purposefully aging gates in a post-silicon target circuit based on, or as dictated by, a targeted metric. The targeted metric may involve, without limitation, leakage energy reduction requirements and timing constraints associated with the target circuit. In addition, the term "standby mode" generally refers to a low power mode for a target circuit throughout the present disclosure.

Various models have been developed in the present disclosure, and they are detailed in the following paragraphs.

Energy Model

In some embodiments, leakage energy, switching energy, and delay may be used as manifestational properties of an IC. These properties can be connected with physical properties such as effective channel length and threshold voltage. A gate-level leakage energy model may be based on the following parameters: effective channel length (L or $L_{eff}$), threshold voltage ($V_{th}$), gate width (W), supply voltage ($V_{dd}$), sub-threshold slope (n), mobility (μ), oxide capacitance ($C_{ox}$), clock period (D), thermal voltage ($\Phi_t = kT/q$), and drain induced barrier lower (DIBL) factor (σ). An example gate-level leakage energy, $P_{leakage}$, can be represented in Equation 1 as:

$$P_{leakage} = 2 \cdot n \cdot \mu \cdot C_{ox} \cdot \frac{W}{L} \cdot \phi_L^2 \cdot D \cdot V_{dd} \cdot e^{\frac{\sigma \cdot V_{dd} - V_{th}}{n \cdot \phi_t}} \quad (1)$$

A gate-level switching energy model can be represented as $P_{switching}$ in Equation 2 below, where α is the switching probability.

$$P_{switching} = \alpha \cdot C_{ox} \cdot W \cdot L \cdot V_{dd}^2 \quad (2)$$

Based on Equation (1) and Equation (2) above, leakage energy depends exponentially on the difference between supply and threshold voltage. Due to the impact of PV, the threshold voltage of each gate has a value apart from the nominal specification and, therefore, the value of the total leakage energy may exhibit a trend that is difficult to predict or control. However, the exponential dependence of the leakage energy on ($\sigma \cdot V_{dd} - V_{th}$) provides an opportunity to reduce the leakage energy exponentially, assuming that threshold voltage can be increased in a controlled manner in the post-silicon phase. Based on this observation, an aging-based post-silicon tuning approach may significantly reduce the total leakage energy consumption of an IC.

Delay Model

The delay of a single logic gate can be represented in Equation 3 as:

$$d = gh + p \quad (3)$$

where g and h are logical effort and electrical effort, respectively; and p is parasitic delay. In particular, the delay model may be used to connect the gate delay to its sizing (e.g., effective width and length of the gate) and operating voltages. So, an example gate-level delay, Delay, can be represented in Equation 4 as:

$$\text{Delay} = \frac{k_{tp} \cdot k_{fit} \cdot L^2}{2 \cdot n \cdot \mu \cdot \phi_t^2} \cdot \frac{V_{dd}}{\left(\ln\left(e^{\frac{(1+\sigma)V_{dd} - V_{th}}{2 \cdot n \cdot \phi_t}} + 1\right)\right)^2} \cdot \frac{\gamma_i \cdot W_i + W_{i+1}}{W_i} \quad (4)$$

where subscripts i and i+1 represent the driver and load gates, respectively; γ is the ratio of gate parasitic to input capacitance; and $k_{tp}$ and $k_{fit}$ are fitting parameters.

Based on analytical simulation of Equation (4), the delay of a logical gate increases approximately linearly as the increase of threshold voltage. Therefore, if the threshold voltage is increased to lower leakage energy consumption, the speed degradation may be much less than the savings that can be obtained in the leakage energy optimization. However, in order to maintain the timing constraint of the circuit, selective device aging and/or adaptive body bias (ABB) may be used to avoid increasing the delay of certain gates or compensating for the delay increase.

PV may cause major variations in gate-level physical properties such as $L_{eff}$ and $V_{th}$. For example, due to the impact of PV, the actual $L_{eff}$ of a manufactured gate can be expressed by Equation (5), where $L_{nom}$ is the nominal design value of the effective length, and ΔL is the variation in the manufacturing process.

$$L_{eff} = L_{nom} + \Delta L \quad (5)$$

According to Equations (1) to (4), PV would have an indirect impact on the manifestational properties such as delay and power.

In some embodiments, ΔL may be assumed to follow a quad-tree model. In particular, ΔL may be distributed into multiple levels where there are different number of grids allocated on each level. The grids on each level may be assigned some variation values that follow a substantially normal distribution. Then the total ΔL, which can be calculated based on the sum of variation values on each level of the grids that the corresponding gate belongs to, can be represented in Equation (6), where $\Delta L_{ij}$ is the $i_{th}$ level of the grid that the gate belongs to, $\mu_i$ and $\sigma_i$ are parameters of the Gaussian distribution at level i. Using this model for $L_{eff}$, the spatial correlation of PV on an IC may be captured.

$$\Delta L = \sum_i \Delta L_{ij}, \text{ where } \Delta L_{ij} \sim N(\mu_i, \sigma_i) \quad (6)$$

In addition, the distribution of $V_{th}$ may be obtained by the simulation study of random dopant. $V_{th}$ in this model may be fit into a Gaussian distribution in which the parameters are determined by the dopant number and dopant position.

Aging Model

The time dependence of $V_{th}$ shift due to negative bias temperature instability (NBTI) generally may follow fractional power law of the stress time, as shown in Equation 7 below:

$$\Delta V_{th} = A \cdot \exp(\beta V_G) \cdot \exp(-E_\alpha / kT) \cdot t^{0.25} \quad (7)$$

where $V_G$ is the applied gate voltage; A and β are constants; $E_\alpha$ is the measured activation energy of a NBTI process; T is the temperature; and t is the stress time.

With the above discussed models, FIG. 1 shows a block diagram of an example process for performing aging-based leakage energy reduction for a post-silicon target circuit, in accordance with at least some embodiments of the present disclosure. The example process may include an aging input vector (IV) selection block 102, a post-silicon IC aging block 112, and a standby mode IV selection block 116. One embodiment of the aging IV selection block 102 may also include a simulation-based weights assignment block 104, a candidate IV selection block 106, and/or an aging IV selection block 108. The candidate IV selection block 106 may refer to an energy/delay model 114, and the aging IV selection block 108 may refer to an aging model 110. One example of the aging model 110 may correspond to the aforementioned Aging Model and Equation (7). One example of the energy/delay model 114 may correspond to the aforementioned Energy Model and Equations (1) and (2) and also the aforementioned Delay Model and Equations (3)-(6).

In the simulation-based weights assignment block 104, a simulation may be performed to the target circuit, so that one or more weights may be assigned to each gate in the target circuit indicative of the contribution of the gate to the overall energy consumption and critical timing constraints of the target circuit. The one or more weights depend on how often the gate stays on each level of leakage current in the operational mode. The weights may relate to one or both of timing and/or energy consumption.

In the candidate IV selection block 106, a set of candidate input vectors may be selected for aging gates in the target circuit. The goal may be to stress a first set of gates (e.g., the gates that are off a critical path (non-CP gates)) to reduce the energy consumption while keeping a second set of gates (e.g., the gates on a critical path (CP gates)) unstressed. By formulating this candidate input vector selection problem as a satisfiability (SAT) problem and by conducting an iterative SAT solving process, a set of desired input vectors are obtained. Due to the size of the target circuit, the SAT problem may not be satisfiable if all the gates are taken into consideration. Therefore, during the iterative SAT solving process, gates with less weight factors as determined in the simulation-based weights assignment block 104 may be removed from consideration to make the SAT problem solvable while still keeping a certain energy consumption level.

In the aging IV selection block 108, a set of aging input vectors from the candidate set determined in the candidate IV selection block 106 may be selected to stress the target circuit. The goal may be to maximize the stress of the non-CP gates and keep the delay of the circuit within a specific threshold. This operation may involve formulating a linear program (LP), in which the objective function is to maximize the total energy of the non-CP gates. For the timing constraints, since the CP gates keep changing during the aging process, they may be approximated using the longest path over gates. By solving the LP, the specific input vectors for aging may be obtained, as well as how much time to apply each of them.

In the post-silicon IC aging block 112, one or more selected input vectors can be applied to age the target circuit. The aging status may be monitored using physical level gate-level characterization.

After aging the target circuit, in the standby mode IV section block 116, additional one or more input vectors may be selected to be applied to the target circuit when the target circuit is in standby mode. In some embodiments, by adjusting and referring to the energy/delay model 114, one or more input vectors may be selected so that the CP gates of the target circuit are not constantly stressed while the target circuit stays on low leakage energy. Subsequent paragraphs will provide additional details for each of the aforementioned blocks in FIG. 1.

In some embodiments of the simulation-based weights assignment block 104, simulation may be conducted using the target circuit to obtain a leakage profile for all the gates. The leakage energy of a gate may be dependent on its input signals. For example, Table 1 below shows the measured leakage current for an example NAND gate on all the combinations of its input signals. Using similar lookup tables, if all the input signals for all the gates in the target circuit in the normal operation mode are tracked, then the leakage energy consumption for the gates can be identified.

TABLE 1

Leakage current of a NAND gate

| Input | Leakage Current (nA) |
|---|---|
| 00 | 37.84 |
| 01 | 100.3 |
| 10 | 95.17 |
| 11 | 454.5 |

Further, in the simulation, m input vectors may be applied to the target circuit and the signals of all n gates may be logged under each input vector i. Based on the lookup tables, the leakage current value $P_{ij}$ may be obtained for each gate j under input vector i. The average leakage current of a gate may then be used as a first type of a weight factor, and this first type of weight factor may be represented by Equation (8) below:

$$\text{Weight}_i = \frac{1}{m}\sum_{i=1} mP_{ij} \qquad (8)$$

In short, this first type of weight factor can serve as an indicator how much leakage energy is consumed by each gate.

Similarly, a second type of weight factor may also be assigned to each gate based on the timing of the gate (e.g., delay experienced at the gate) in the normal operation mode. For instance, a higher weight may be assigned to gates that experience higher delay before aging and that belong to more constrained epsilon critical paths of the target circuit. Because such gates may have a high contribution to the eventual critical path of the target circuit, assigning a higher weight to such gates may help to ensure that these gates are not subject to additional slow-down due to device aging.

Figure 2:
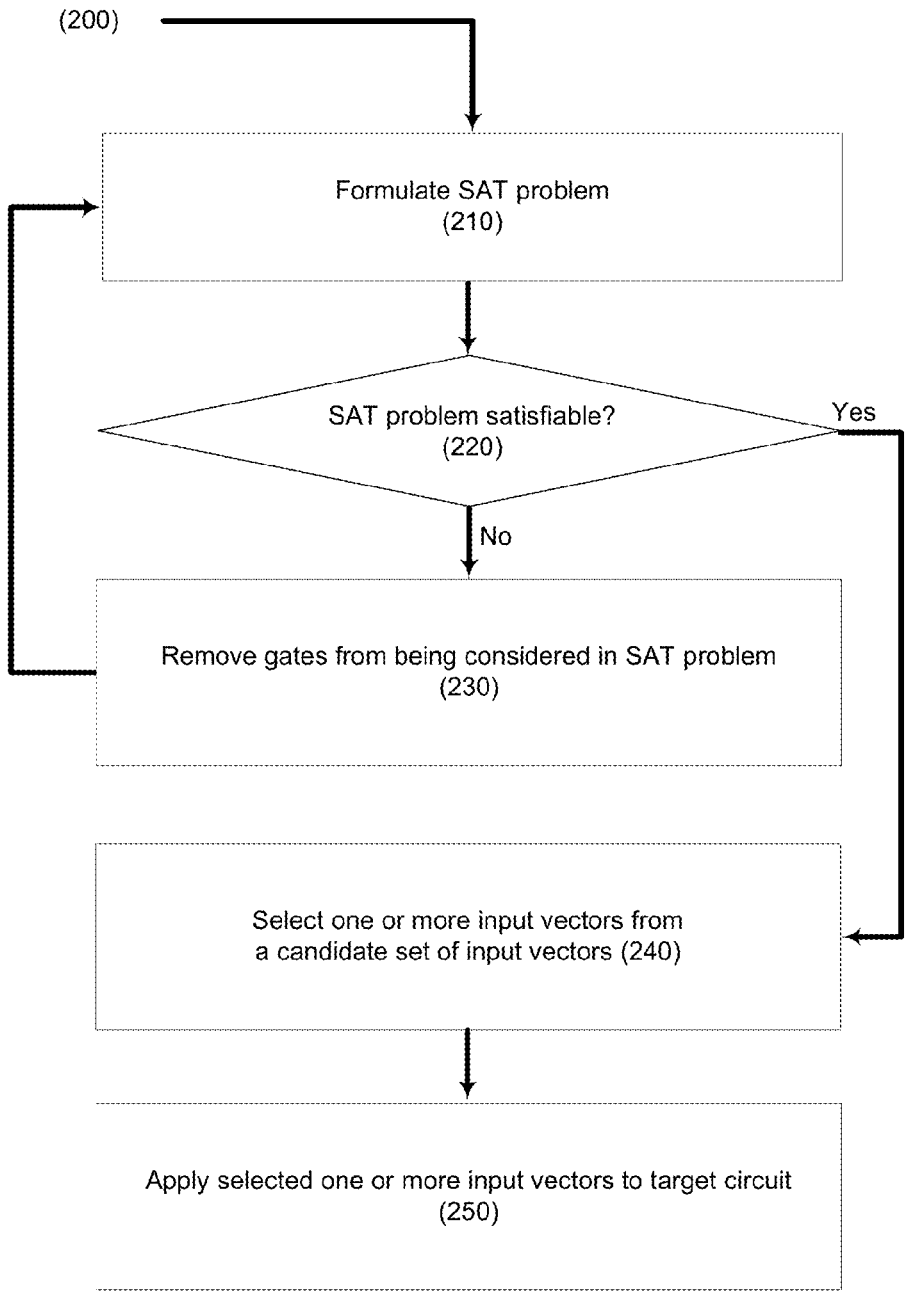
FIG. 2 shows an example method for identifying one or more input vectors for post-silicon IC aging.

FIG. 2 shows an example method for identifying one or more input vectors for post-silicon IC aging, such as the candidate IV selection block 106 and the aging IV selection block 108 and of FIG. 1, in accordance with at least some embodiments of the present disclosure. Method 200 may include one or more operations, functions, or actions as illustrated by one or more of blocks 210-250. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for method 200 may being at block 210, "formulate SAT problem," which may be followed by decision block 220, "SAT problem satisfiable?" If the SAT problem is satisfiable, then block 220 may be followed by block 240, "select one or more input vectors from a candidate set of input vectors." Otherwise, block 220 may be followed by block 230, "remove gates from being considered in SAT problem." Block 240 may be followed by block 250, "apply selected one or more input vectors to target circuit."

In some embodiments, a Boolean SAT is formulated in block 210 to determine if a set of variables can be assigned to satisfy a Boolean formula. For example, suppose the netlist of the target circuit is known, and the signal of each gate can be expressed as a Boolean formula with a set of primary input signals as the variables. Therefore, the input vector selection problem that intends to set a specific gate or a set of gates to specific signals can be converted to a SAT problem. By solving the SAT problem, the desirable input vectors can be found based on gates signals requirements. Several SAT solvers may be used to obtain a solution, such as SAT4J.

In addition, in block 210, a set of objective criteria may be used to specify the signals of a subset of gates for which input vectors are being obtained. The gates that are not included in the objective criteria may not be considered in the SAT solving process. For example, the objective criteria in the SAT problem may follow the following format:

$$obj_i=0|1, i=1 \ldots k \qquad (9)$$

where $obj_i$ corresponds to a gate identification (ID) in the circuit netlist, and k is the number of gates that are expected to specify signal 0 or 1. If the SAT problem is satisfiable, the output from solving the SAT problem may correspond to a set of candidate input vectors that satisfies the objective criteria.

Figure 3:
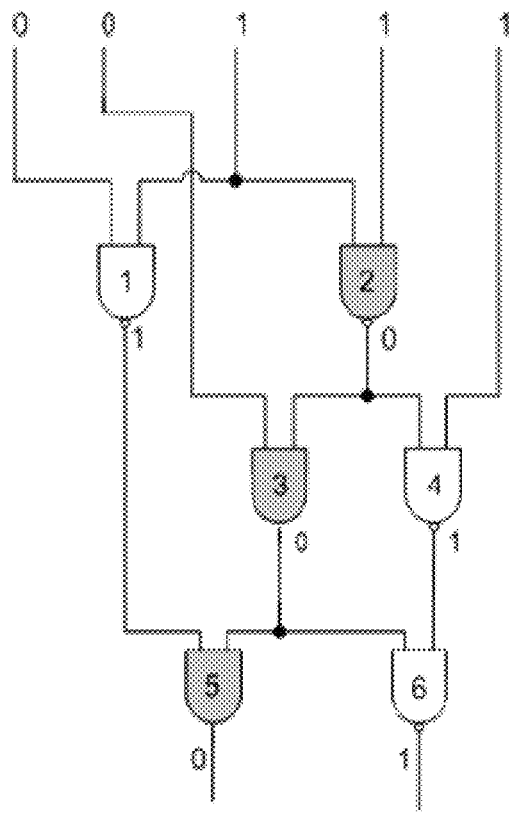
FIG. 3 is an example satisfiability problem formulation.

FIG. 3 is an example SAT problem formulation, in accordance with at least some embodiments of the present disclosure. In the objective criteria, all the CP gates (gates 2, 3, and 6) are set to signal 0, and all the non-CP gates (gates 1, 4, and 5) are set to signal 1. Suppose the SAT problem is satisfiable, the input vector 00111 may be selected to satisfy the specified objective criteria.

As mentioned above, when the SAT problem is determined not to be satisfiable in block 220, in some embodiments, requirements specified in the SAT problem may be loosened. For instance, unimportant gates in terms of contribution to total leakage energy of the target circuit may be removed from being considered in the SAT problem in block 230. For CP gates, the importance of a gate may be determined by its delay property. According to the gate delay model, a gate may be considered relatively unimportant for candidate input vector selection if it is fast by itself and/or driven by few other gates. For non-CP gates, the leakage energy of a gate may be the major concern. A gate may be considered relatively unimportant if it consumes less leakage energy compared to other gates in the circuit.

For illustration, the method 200 may begin with the objective criteria of setting all the signals of CP gates to 0 and non-CP gates to 1 in formulating the SAT problem. If the resulting SAT problem is not satisfiable, the gate that has the lowest weight (as determined in the simulation-based weights assignment block 104 of FIG. 1) may be removed from being considered in the SAT objective criteria until a satisfiable SAT problem is obtained. One example process is shown in the table below:

---
Algorithm 1 Iterative Input Vector Selection
---
Input: Netlist of the target circuit; PV Model;
Output: Input vector set IV for aging
  1:        Calculate critical path gates set CP
  2:        for each $obj_i$ in SAT S do ---
Algorithm 1 Iterative Input Vector Selection
---
  3:           if $obj_i \in$ CP then
  4:              $obj_i = 0$;
  5:           else
  6:              $obj_i = 1$;
  7:           end if
  8:        end for
  9:        IV = sat_solve(S);
10:        while IV == ∅ do
11:           Remove $Obj_i$ with the lowest weight from SAT S;
12:           IV = at_solve(S);
13:        end while
14:        return IV;

The iterative process shown in FIG. 2 and the table above may generate a set of candidate input vectors that can be used in the IC aging process (e.g., post-silicon IC aging 112 from FIG. 1) to stress a certain set of gates (e.g., the non-CP gates) for leakage energy savings. Although the SAT objective criteria may specify setting the other set of gates (e.g., CP gates) in the unstressed mode (e.g., signal 0), due to the aging impact on the stressed non-CP gates and the unpredictable PV, the critical path may change over time and a subset of the initial non-CP gates may become CP gates as the target circuit ages. Therefore, they may impact the delay of the target circuit, and the speed of the target circuit may be substantially degraded because of the constant stress applied to the previously non-CP gates by applying the candidate input vectors.

To consider not only leakage energy savings but also the timing constraint of the target circuit, in block 240, a subset of input vectors may be selected from the entire set of the candidate input vectors to keep the timing constraint of the target circuit satisfied.

Figure 4:
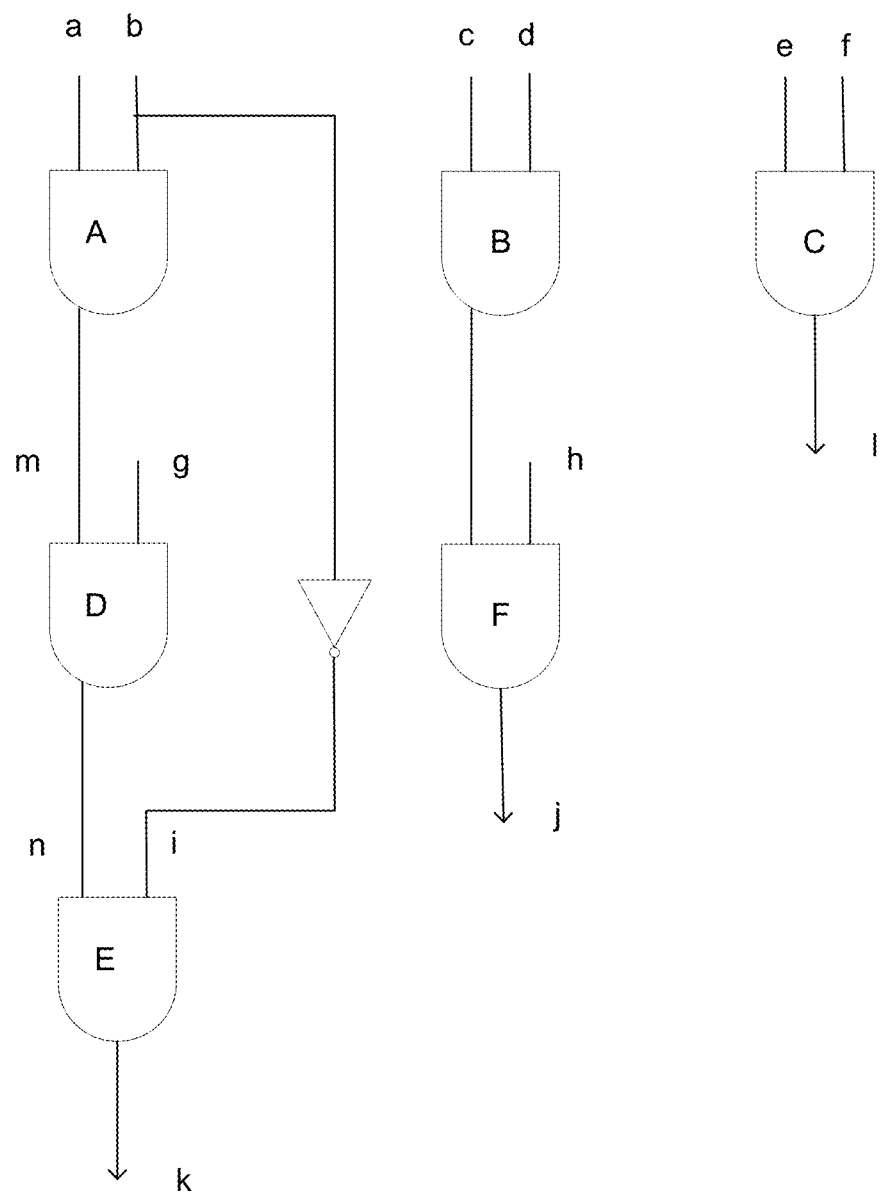
FIG. 4 shows examples of critical path and valid sensitization (sensitizable) critical path.

There are a number of timing constraints that can be naturally of importance when a specific design is synthesized. FIG. 4 shows examples of critical path and valid sensitization (sensitizable) critical path, in accordance with at least some embodiments of the present disclosure. In particular, there are 6 AND gates (A, B, C, D, E, and F) and one inverter. Primary inputs are denoted using small letters (a, b, c, d, e, and f). Primary outputs are also denoted using small letters (k, j, and l). Intermediate signals are denoted using letters g, h, i, j, m, n, and p. Suppose each gate has 10 picoseconds (ps) delay.

The critical path in the example design of FIG. 4 may go through gates A, D, and E, and the delay from input a or input b to output k may be 30 ps long. However, such a critical path may be considered a false path due to a possible race condition. In particular, AND gates A and E have as their inputs signals b and NOT b respectively. With the delay of the inverter, when the input signal b to A changes (e.g., changing to 1), and the input NOT b signal to E cannot simultaneously change (e.g., changing to 0). On the other hand, the path going through gates B and F is valid and can be referred to as a valid sensitization critical path. In this example, the delay from input c to output j is 20 ps long, and thus the delay for the valid sensitization critical path in this example design is 20 ps, instead of 30 ps, long.

Moreover, other example types of timing constraints include latency and throughput, which may be due to any number of constraints, such as race conditions. Latency may be defined as the time when the latest output is correctly computed measured from the moment when the latest input data is available. Throughput may be defined as the largest delay between the output of any sequential element to the input of any sequential element.

Figure 5:
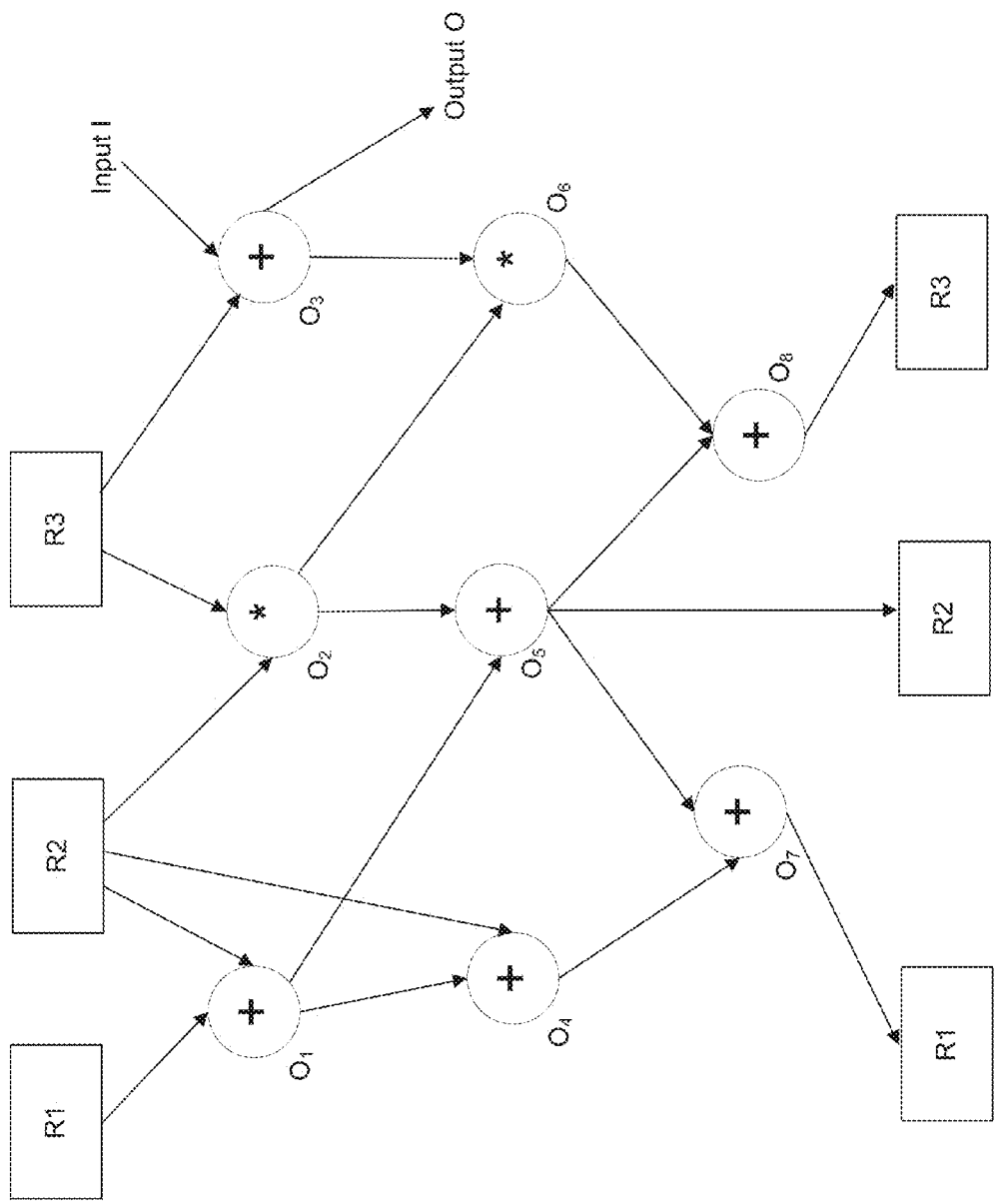
FIG. 5 shows example latency and throughput.

FIG. 5 shows example latency and throughput, in accordance with at least some embodiments of the present disclosure. Specifically, three sequential elements (e.g., registers) denoted R1, R2, and R3 shown in FIG. 5 are drawn twice to make the figure easier to follow. FIG. 5 also includes 8 arithmetic operations utilizing registers R1, R2, and R3 denoted by o1, o2, o3, o4, o5, o6, o7, and o8. Suppose each operation has a delay of 10 nanoseconds (ns). The latency in this example circuit may correspond to the time required for a signal from input I to reach output O, which may be 10 ns. In another example, the delay from R1 to R3 may be 30 ns.

In light of the present disclosure, it should be apparent to one having ordinary skills in the art to recognize that there are numerous other types of timing constraints, including, without limitation, synchronization, jitter, and precedence. For example, a particular type of event may need to be scheduled before some other type of event.

To achieve the goal of selecting a subset of input vectors from the candidate input vectors while keeping the timing constraint associated with the target circuit satisfied in block 240, one embodiment may be to set an additional set of timing constraints in a linear program, where the objective function may be to minimize the total leakage energy of a certain set of gates (e.g., the non-CP gates). For example, the maximum number of non-CP gates can be represented in Equation (10) below:

$$\text{maximize} \sum_{i=1}^{n} \sum_{j=1}^{m} \alpha_j p_{ij} \quad (10)$$

where n is the number of non-CP gates; m is the number of candidate input vectors obtained from the method 200; $\alpha_j$ (j=1 . . . m) is the percentage of time to apply each candidate input vector; and $p_{ij}$ (i=1 . . . n; j=1 . . . m) is the expected leakage energy of non-CP gate i when input vector j is applied. The maximum number of non-CP gates may be placed in the stress mode: Among all the parameters, n can be obtained from the netlist of the target circuit; m may be provided by the aforementioned method 200; $\alpha_j$'s are the variables being characterized in the LP; and $p_{ij}$ can be obtained by the simulation process, except that the input vectors are fixed to each of the m candidate input vectors instead of being randomly selected.

When formulating the timing constraints in the LP, it should be noted that the critical path of the target circuit may be dependent on the selected input vectors, which also happens to be the output that is expected to be obtained from the LP. In some embodiments, to address this issue, the possible critical paths of the target circuit may be approximated using the initial longest paths in terms of delay through each gate, which can be obtained regardless of the change of the CP.

Based a targeted metric (e.g., timing constraints, leakage energy reduction requirements, etc.) associated with the target circuit, the candidate set of input vectors are identified, and one or more of input vectors are selected from the candidate set of input vectors. In block 250, the selected one or more input vectors, as well as the amount of time for their application, are applied to the target circuit.

Figure 6:
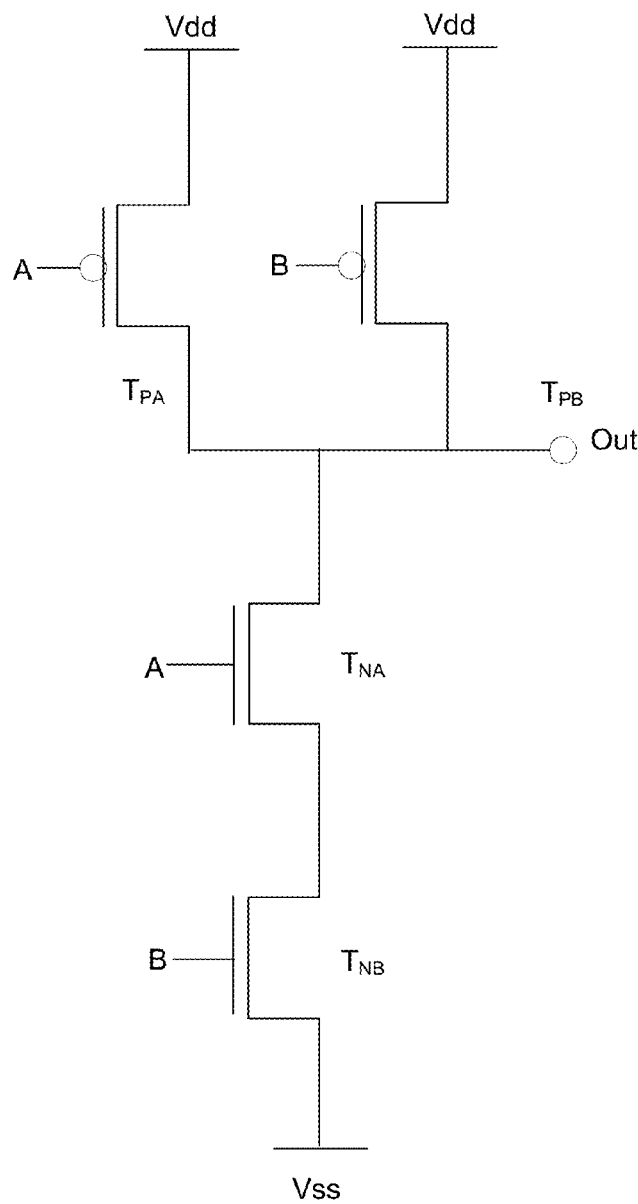
FIG. 6 shows an example gate and the dependency between its inputs and outputs.

To further illustrate the relationship between providing input vectors to a gate and the purposeful aging of the gate, FIG. 6 shows an example gate and the dependency between its inputs and outputs, in accordance with at least some embodiments of the present disclosure. A transistor ages when it acts as an open switch, because in that situation its channel is under stress. The NAND gate table in FIG. 6 shows the dependency between the inputs and the outputs, and the table on the right shows when and which transistor is considered open (e.g., under stress). "C" indicates a closed switch, and "O" indicates an open switch for a particular transistor. For example, if transistor T_PA is to be aged, then input a should be set to 1. If transistor T_PB is to be aged, then input b should be set to 1.

The aforementioned Equation (7) illustrates the connection between the time of stress and $V_{th}$ (i.e., threshold voltage). Equation (4) shows the relationship between the delay and $V_{th}$. Switching can result in energy dissipation that increases the temperature. Equation (7) indicates that at higher temperatures, aging may be exponentially faster.

Figure 7:
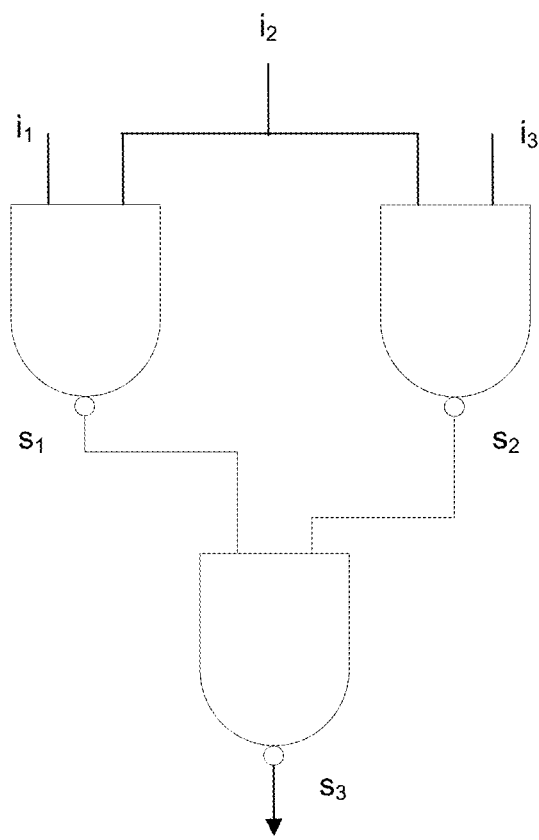
FIG. 7 shows another example of how input vectors may be applied to create purposeful gate switching at a particular place and therefore increase the temperature.

FIG. 7 shows another example of how input vectors may be applied to create purposeful gate switching at a particular place and therefore increase the temperature, in accordance with at least some embodiments of the present disclosure. For example, if vectors (1, 1, 0) and (1, 1, 1) are applied as input signals i1, i2, and i3, then the output of gate s2 will change values, and the outputs of gates s1 and s3 will remain unchanged. If vectors (0, 1, 1) and (1, 1, 1) are applied as input signals i1, i2, and i3, then the output of gate s1 will change values, and the outputs of gates s2 and s3 will remain unchanged.

During the process of aging the gates of the target circuit, the threshold voltage of each gate may be monitored, especially for the CP gates, in order to increase the likelihood that the threshold voltage shift does not detrimentally impact the functionality of the gate. Since it is difficult to measure the threshold voltage at gate level directly, in some embodiments, a non-destructive gate-level characterization approach may be used that involves global power/delay measurements.

Specifically, manifestation-level characterization may be conducted to determine the power/delay of each gate on the target circuit by solving a system linear equations using linear programming. Physical level characterization may be conducted to calculate the $V_{th}$ and $L_{eff}$ of each gate, based on the manifestational properties and the models shown in the aforementioned Equations (1) to (4). This may be represented as a nonlinear programming process, since the models of power and delay may be represented as nonlinear with respect to $V_{th}$ and $L_{eff}$.

In some embodiments, at the manifestation level, a model can be expressed in a linear format assuming that the variation of all the physical level properties is represented by a single PV scaling factor K. The full-chip leakage power at input state j, $\tilde{p}_j$, can be represented in Equation (12) using the linear model at manifestation level below:

$$\tilde{p}_j = e_{sj} + e_{rj} + \sum_{\forall gate\ i=1,\ldots,n} K_{ij} s_i \quad (12)$$

where $s_i$ is the PV scaling factor of gate i; $K_{ij}$ is the nominal leakage power for the gate at input state j, which is dependent on the constant parameters in (1) and input states (The value of $K_{ij}$ can be found in a lookup table); and $e_{sj}$ and $e_{rj}$ are systematic and random measurement errors, respectively. A system of linear equations can be obtained by varying the primary input vectors and measuring the leakage power of the entire target circuit at each time. Then, by solving the system of equations with an objective function of minimizing the measurement errors, the gate-level PV scaling factors can be characterized and the leakage power for each gate can be obtained.

From the characterization results of the manifestational properties, a nonlinear equation based on Equation (1) representing gate-level leakage energy, $P_{leakage}$, can be formulated in Equation (13) as:

$$P_{leakage} = \frac{A}{L_{eff}} \cdot T^2 \cdot e^{\frac{C-V_{th}}{BT}} \quad (13)$$

where $L_{eff}$ and $V_{th}$ are the two variables that are being characterizing. A, B and C may represent transistor level parameters in the leakage power model that may be assumed as constant values in the model.

Equation (13) provides a nonlinear equation that relates $L_{eff}$ and $V_{th}$ to the manifestational property (e.g., leakage power). The leakage power value can be obtained from the manifestation-level characterization. However, with one nonlinear equation, it may not be possible to solve the two variables $L_{eff}$ and $V_{th}$. Therefore, additional variations may be added to the leakage power model, so that a system of nonlinear equations can be obtained. In an embodiment, this goal may be achieved by varying the temperatures of the target circuit using thermal conditioning. Leakage power generally has an exponential relation with temperature T, and thermal conditioning can be used to control the temperatures and obtain multiple leakage power nonlinear equations for each single gate. By applying different temperature T to the target circuit and repeating the manifestation level characterization in terms of leakage power, a system of nonlinear equations can be formulated. The nonlinear equations can then be solved using a nonlinear program solver to obtain characterization results for $V_{th}$ and $L_{eff}$.

Besides using timing constraints in the aforementioned LP formulation, adaptive body bias (ABB) may be used to compensate the delay degradation associated with the target circuit. ABB may be an effective approach to compensate for the PV impact on performance and power consumption. It provides the ability to manipulate transistor threshold voltage through the body effect and thus enables either a forward or a reverse body effect to change threshold voltage. In particular, ABB may be utilized to manipulate the threshold voltages associated with the CP gates that are increased by aging, so that the degradation in critical path delay in the target circuit is compensated.

ABB can be used to change the $V_{th}$ simultaneously for multiple transistors (e.g., all transistors in a circuit) in the same direction (e.g., increasing or decreasing threshold voltage). One can create multiple ABB circuitry. ABB may be applied to a circuit by adjusting an internal voltage regulator on-chip or by connecting a particular pin to a particular level of voltage before the chip is shipped to a customer.

ABB may be used to improve timing or leakage energy requirements. For example, if a timing or leakage energy requirement has been inadvertently violated through aging, such as the purposeful aging process as detailed above, ABB may be used to recover from the problem.

Based on the observations that (1) an IC may stay in a standby mode for most of the time during its operations, and (2) there may be a big difference between the highest level and lowest level leakage values when different input vectors are applied to the IC, various standby mode optimization approaches may be applied. However, the existing approaches typically consider the leakage savings and neglect the fact that the input vectors that lead to low level leakage values might age the circuit in an unexpected way.

Figure 8:
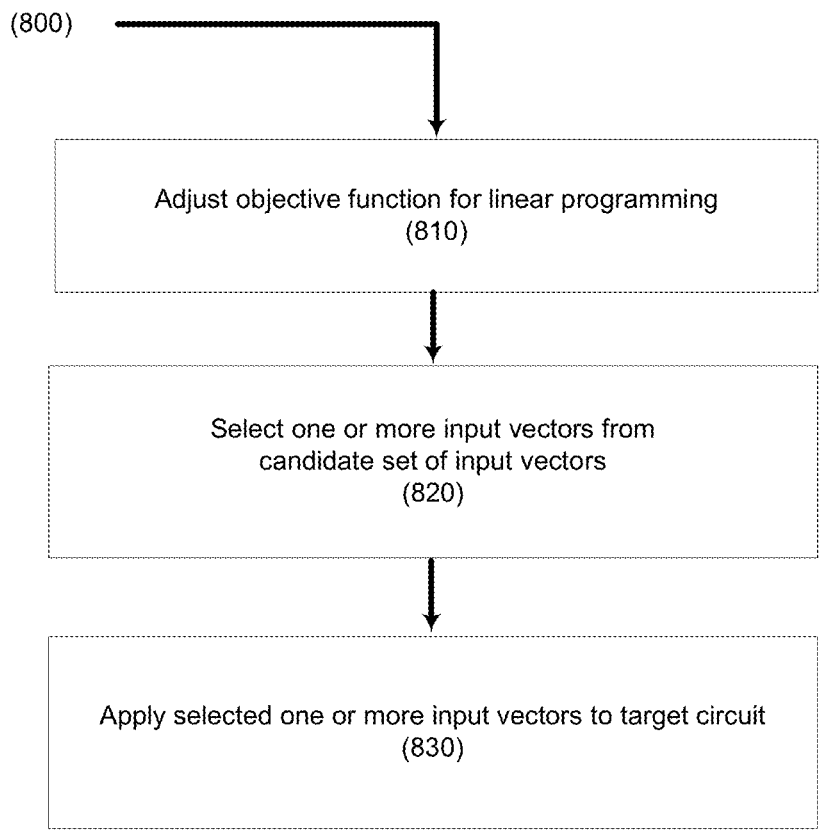
FIG. 8 shows an example method 800 for identifying one or more input vectors for post-silicon IC aging in a standby mode.

The issue of standby mode leakage energy reduction can be addressed using SAT and LP based approaches as detailed above. FIG. 8 shows an example method 800 for identifying one or more input vectors for post-silicon IC aging in a standby mode, such as the standby mode IV selection block 116 of FIG. 1, in accordance with at least some embodiments of the present disclosure. Method 800 may include one or more operations, functions, or actions as illustrated by one or more of blocks 810-830. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for method 800 may begin at block 810, "adjust objective function for linear programming," which may be followed by block 820, "select one or more input vectors from candidate set of input vectors." Block 820 may be followed by block 830, "apply selected one or more input vectors to target circuit."

In some embodiments, the objective function specified in the aforementioned Equation (10) may be adjusted for the LP in block 810 to substantially minimize the leakage energy of all the CP and non-CP gates in the target circuit, while keeping the same delay constraints for the consideration of speed. After solving the LP and selecting one or more input vectors, in block 830, the selected one or more input vectors may be applied to the target circuit in the standby mode for leakage energy reduction and to avoid aging the critical paths to cause delay increase beyond the specified timing constraints.

Furthermore, the systems and methods described herein may be also used to improve yield for, and/or to correct for hot spots in the target circuit. For example, in some embodiments, to eliminate or reduce hot spots, the threshold voltages for the transistors in a certain portion of the target having been identified to exceed a threshold temperature may be reduced to reduce leakage energy in that part of the target circuit. In other embodiments, for systems requiring higher speed performance, yield may be improved by using the aforementioned ABB to reduce threshold voltages while increasing speed for the target circuit. The ABB may be calculated in such a way to ensure a specified speed of execution for a target circuit while the leakage energy associated with the target circuit is minimized. This specified speed can be found using binary search.

In some embodiments, the systems and methods described herein may be conducted during the manufacturing and testing phase of a target circuit or when the target circuit is in the field. For example, a computing device, coupled to the target circuit, may be configured to perform the above described gate level characterization and input vector generation and also load the appropriate input vectors in selected programmable circuits (e.g., flip-flops) to initiate the post-silicon aging of the target circuit. In situations where the target circuit is being used in a device in the field, the device may from time to time connect to a server, where the server may load the device with a new input vector. This new input vector may differ from the input vector that was applied to the target circuit during its manufacturing and testing phase. The device may then place the target circuit in standby mode and apply the new input vector to the target circuit.

Figure 9:
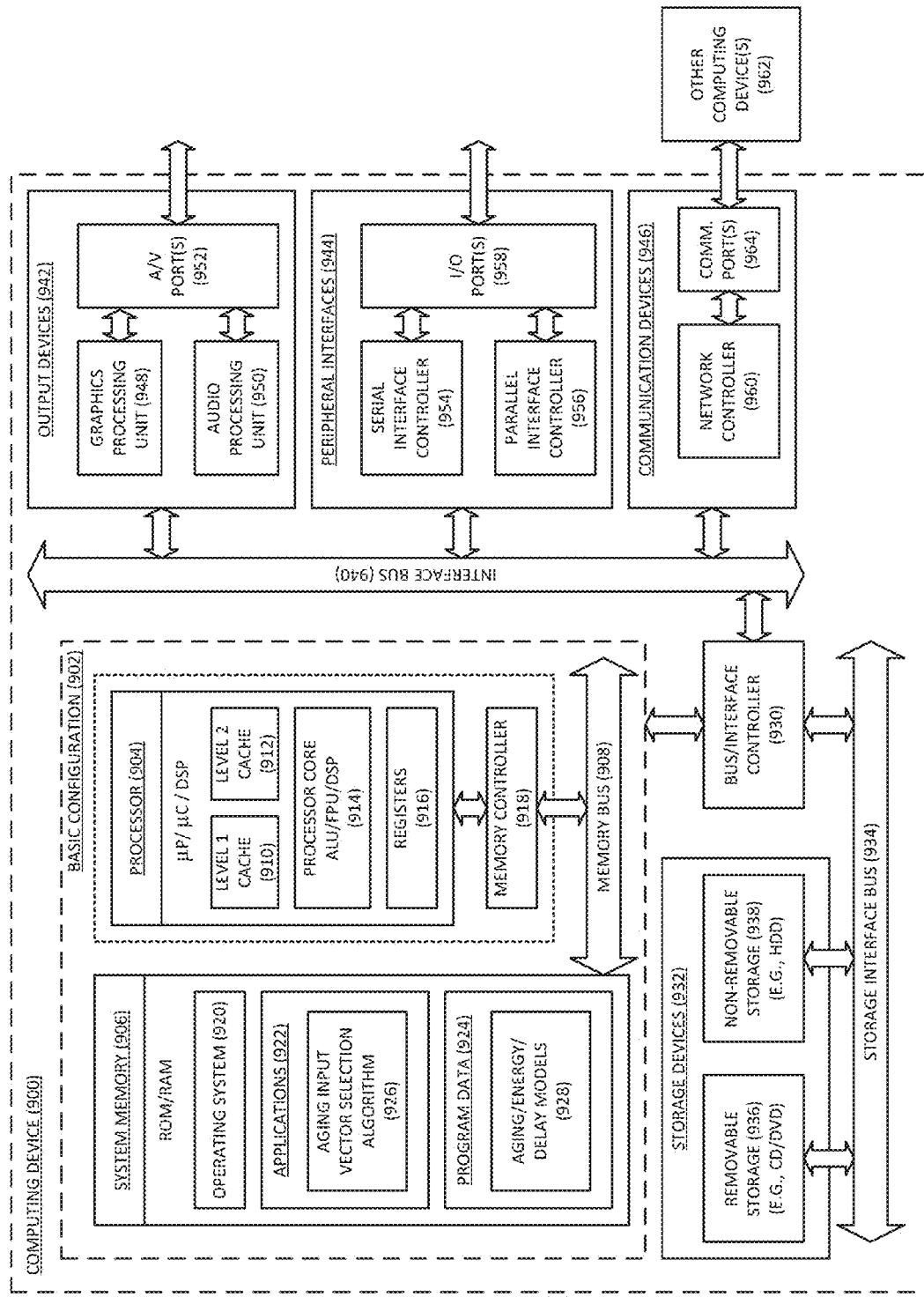
FIG. 9 is a block diagram of an example computing device configured to purposefully age a post-silicon target circuit, all arranged in accordance with some embodiments of the present disclosure.

FIG. 9 is a block diagram of an example computing device configured to purposefully age a post-silicon target circuit, arranged in accordance with at least some embodiments of the present disclosure. In a very basic configuration, computing device 900 typically includes one or more host processors 904 and a system memory 906. A memory bus 908 may be used for communicating between host processor 904 and system memory 906.

Depending on the desired configuration, host processor 904 may be of any type including but not limited to a microprocessor (µP), a microcontroller (µC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP core), or any combination thereof. An example memory controller 918 may also be used with processor 904, or in some implementations, memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include an aging input vector selection algorithm 926 that can be arranged to perform the functions as described herein including those described with respect to at least the block 102 of FIG. 1, the method 200 of FIG. 2, and the method 800 of FIG. 8. Program data 924 may include parameters associated with aging/energy/delay models (928) (e.g., the aging model 110 and the energy/delay model 114 of FIG. 1). In some embodiments, application 922 may be arranged to operate with program data 924 on operating system 920 such that implementations of input vector generation may be performed as described herein. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964. In some implementations, computing device 900 includes a multi-core processor, which may communicate with the host processor 904 through the interface bus 940.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link and/or channel, a wireless communication link and/or channel, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to reduce leakage energy associated with a post-silicon target circuit, the method comprising:
   determining an extent to which a plurality of gates in the target circuit is to be aged based on a targeted metric that includes a timing constraint associated with the target circuit;
   based on the targeted metric, aging, to the determined extent, a first set of gates of the plurality of gates;
   based on the targeted metric, aging, to less than the determined extent, a second set of gates of the plurality of gates: and
   based on the targeted metric, applying an adaptive body bias (ABB) to the target circuit.

2. The method of claim 1, further comprising characterizing the plurality of gates at a transistor or gate level.

3. The method of claim 1, further comprising assigning a first weight and a second weight to each gate in the target circuit based on a contribution of each gate to energy consumption and critical timing constraints associated with the target circuit, wherein the first weight is associated with the leakage energy, and wherein the second weight is associated with timing.

4. A method to reduce leakage energy associated post-silicon target circuit, the method comprising:
   assigning a first weight and a second weight to each gate in the target circuit based on a contribution of each gate to energy consumption and critical timing constraints associated with the target circuit, wherein the first weight is associated with the leakage energy, and wherein the second weight is associated with timing;
   formulating a satisfiability (SAT) problem that includes a first set of objectives for a first set of gates and a second set of objectives for a second set of gates to reduce the leakage energy associated with the target circuit;
   selecting a set of candidate input vectors for the target circuit through an iterative solution of the SAT problem by removal of one or more gates from being considered in the first set of objectives and the second set of objectives based on the first weight and the second weight;
   based on a targeted metric that includes a timing constraint associated with the target circuit, determining an extent to which a plurality of gates, which includes the first set of gates and the second set of gates, in the target circuit is to be aged;
   based on the targeted metric, applying the selected set of candidate input vectors to age, to the determined extent, the first set of gates of the plurality of gates: and
   based on the targeted metric, applying in the selected set of candidate input vectors to age, to less than the determined extent, the second set of gates of the plurality of gates.

5. The method of claim 4, further comprising selecting a subset of input vectors from the selected set of candidate input vectors such that the timing constraint associated with the target circuit is satisfied.

6. The method of claim 5, further comprising setting the timing constraint in a linear program that includes an objective to reduce leakage energy associated with a certain set of gates of the plurality of gates.

7. The method of claim 6, further comprising approximating a possible critical path in the target circuit based on an initial longest path in terms of delays associated with a subset of gates along the initial longest path.

8. A non-transitory computer-readable medium that includes instructions to reduce leakage energy associated with a post-silicon target circuit, wherein the instructions, in response to execution by a processor, cause the processor to perform or control performance of operations to:
   determine an extent to which a plurality of gates in the target circuit is to be aged based on a targeted metric that includes a timing constraint associated with the target circuit;
   based on the targeted metric, age, to the determined extent, a first set of gates of the plurality of gates;
   based on the targeted metric, age, to less than the determined extent, a second set of gates of the plurality of gates; and
   based on the targeted metric, apply an adaptive body bias (ABB) to the target circuit.

9. The non-transitory computer readable medium of claim 8, wherein the instructions comprise instructions, which in response to execution by the processor, cause the processor to perform or control performance of at least one operation to:
   characterize the plurality of gates at a transistor or gate level.

10. The non-transitory computer readable medium of claim 8, wherein the instructions comprise instructions, which in response to execution by the processor, cause the processor to perform or control performance of at least one operation to:
    assign a first weight and a second weight to each gate in the target circuit based on a contribution of each gate to energy consumption and critical timing constraints associated with the target circuit, wherein the first weight is associated with the leakage energy, and wherein the second weight is associated with timing.

11. The non-transitory computer readable medium of claim 10, wherein the instructions comprise instructions, which in response to execution by the processor, cause the processor to perform or control performance of at least one operation to:
    formulate a satisfiability (SAT) problem that includes a first set of objectives for the first set of gates of the plurality of gates and a second set of objectives for the second set of gates of the plurality of gates to reduce the leakage energy associated with the target circuit; and
    select a set of candidate input vectors for the target circuit through an iterative solution of the SAT problem by removal of one or more gates from being considered in the first set of objectives and the second set of objectives based on the first weight and the second weight, wherein to age, to the determined extent, the first set of gates of the plurality of gates, and to age, to less than the determined extent, the second set of gates of the plurality of gates, the instructions, in response to execution by the processor, cause the processor to perform or control performance of at least one operation to:

apply the set of candidate input vectors to the plurality of gates to stress the plurality of gates.

12. The non-transitory computer readable medium of claim 11, wherein the instructions comprise instructions, which in response to execution by the processor, cause the processor to perform or control performance of at least one operation to:

select a subset of input vectors from the set of candidate input vectors such that the timing constraint associated with the target circuit is satisfied.

13. The non-transitory computer readable medium of claim 12, wherein the instructions comprise instructions, which in response to execution by the processor, cause the processor to perform or control performance of at least one operation to:

set the timing constraint in a linear program that includes an objective to reduce leakage energy associated with a certain set of gates of the plurality of gates.

14. The non-transitory computer readable medium of claim 13, wherein the instructions comprise instructions, which in response to execution by the processor, cause the processor to perform or control performance of at least one operation to:

approximate a possible critical path in the target circuit based on an initial longest path in terms of delays associated with a subset of gates along the initial longest path.

15. A computing device coupled to a post-silicon target circuit and configured to reduce leakage energy associated with the post-silicon target circuit, the computing device comprising:
  a programmable unit; and
  a processor, a operatively coupled to the programmable unit, wherein the processor is configured to:
  determine an extent to which a plurality of gates in the target circuit is to be aged based on a targeted metric that includes a timing constraint associated with the target circuit;
  based on the targeted metric, age, to the determined extent, a first set of gates of the plurality of gates;
  based on the targeted metric, age, to less than the determined extent, a second set of gates of the plurality of gates; and
  based on the targeted metric, apply an adaptive body bias (ABB) to the target circuit.

16. The computing device of claim 15, wherein the processor is further configured to characterize the plurality of gates at a transistor or gate level.

17. The computing device of claim 15, wherein the processor is further configured to:
  assign a first weight and a second weight to each gate in the target circuit based on a contribution of each gate to energy consumption and critical timing constraints of the target circuit, wherein the first weight is associated with the leakage energy, and wherein the second weight is associated with timing.

18. A computing device coupled to a post-silicon target circuit and configured to reduce leakage energy associated with the post-silicon target circuit, the computing device comprising:
  a programmable unit; and
  a processor, operatively coupled to the programmable unit, wherein the processor is configured to:
  assign a first weight and a second weight to each gate in the target circuit based on a contribution of each gate to energy consumption and critical timing constraints associated with the target circuit, wherein the first weight is associated with the leakage energy, and wherein the second weight is associated with timing;
  formulate a satisfiability (SAT) problem that includes a first set of objectives for a first set of gates and a second set of objectives for a second set of gates to reduce the leakage energy associated with the target circuit;
  select a set of candidate input vectors for the target circuit through an iterative solution of the SAT problem by removal of one or more gates from being considered in the first set of objectives and the second set of objectives based on the first weight and the second weight;
  based on a targeted metric that includes a timing constraint associated with the target circuit, determine an extent to which a plurality of gates, which includes the first set of gates and the second set of gates, in the target circuit is to be aged;
  based on the targeted metric, apply the selected set of candidate input vectors to age, to the determined extent, the first set of gates of the plurality of gates; and
  based on the targeted metric, apply the selected set of candidate input vectors to age, to less than the determined extent, the second set of gates of the plurality of gates.

19. The computing device of claim 18, wherein the processor is configured to select a subset of input vectors from the set of candidate input vectors such that the timing constraint associated with the target circuit is satisfied.

20. The computing device of claim 19, wherein the processor is further configured to set the timing constraint in a linear program that includes an objective to reduce leakage energy associated with a certain set of gates of the plurality of gates.

21. The computing device of claim 20, wherein the processor is further configured to approximate a possible critical path in the target circuit based on an initial longest path in terms of delays associated with a subset of gates along the initial longest path.

* * * * *

UNITED STATES PATENT AND TRADEMARK OFFICE
CERTIFICATE OF CORRECTION

| | |
|---|---|
| PATENT NO. | : 9,768,767 B2 |
| APPLICATION NO. | : 15/336808 |
| DATED | : September 19, 2017 |
| INVENTOR(S) | : Potkonjak |

Page 1 of 1

It is certified that error appears in the above-identified patent and that said Letters Patent is hereby corrected as shown below:

Column 1, Line 8, delete "§120 U.S. patent" and insert -- § 120 of U.S. patent --, therefor.

Column 1, Line 14, delete "SYSTEM,"" and insert -- SYSTEM." --, therefor.

Column 17, Line 33, Claim 1, delete "gates: and" and insert -- gates; and --, therefor.

Column 17, Line 45, Claim 4, delete "energy associated" and insert -- energy associated with a --, therefor.

Column 18, Line 3, Claim 4, delete "gates: and" and insert -- gates; and --, therefor.

Column 18, Line 4, Claim 4, delete "applying in the" and insert -- applying the --, therefor.

Column 19, Line 42, Claim 15, delete "processor, a operatively" and insert -- processor, operatively --, therefor.

Column 20, Line 32, Claim 18, delete "plurality of" and insert -- plurality of --, therefor.

Signed and Sealed this
Seventeenth Day of April, 2018

Andrei Iancu
*Director of the United States Patent and Trademark Office*

UNITED STATES PATENT AND TRADEMARK OFFICE
CERTIFICATE OF CORRECTION

PATENT NO. : 9,768,767 B2  
APPLICATION NO. : 15/336808  
DATED : September 19, 2017  
INVENTOR(S) : Potkonjak Page 1 of 1

It is certified that error appears in the above-identified patent and that said Letters Patent is hereby corrected as shown below:

In the Specification

In Column 1, Line 18, below the "CROSS-REFERENCE TO RELATED APPLICATIONS" section and above "BACKGROUND," insert:
-- STATEMENT OF FEDERALLY SPONSORED RESEARCH OR DEVELOPMENT
This invention was made with government support under Grant Numbers 1059435 and 0958369, awarded by the National Science Foundation, and Grant Number FA8750-12-2-0014, awarded by the U.S. Air Force. The government has certain rights in the invention. --

Signed and Sealed this
Fifth Day of January, 2021

Andrei Iancu
*Director of the United States Patent and Trademark Office*